United States Patent [19]

Handke

[11] Patent Number: 4,488,626
[45] Date of Patent: Dec. 18, 1984

[54] TORQUE TRANSMITTING APPARATUS AND METHOD

[76] Inventor: Kenneth E. Handke, c/o Electromatic, Inc., 3615 Superior Ave., Bldg. 42, Cleveland, Ohio 44114

[21] Appl. No.: 290,416

[22] Filed: Aug. 6, 1981

[51] Int. Cl.³ .............................................. F16D 31/00
[52] U.S. Cl. ............................... 192/70.12; 192/58 C; 192/84 C; 192/113 B; 188/163; 188/271; 188/290
[58] Field of Search ................ 192/58 B, 58 C, 70.12, 192/113 B, 58 R, 57, 84 R, 84 B, 84 C; 188/271, 290, 163

[56] References Cited

U.S. PATENT DOCUMENTS

| | | | |
|---|---|---|---|
| 2,884,107 | 4/1959 | Frankel | 192/113 B |
| 3,168,176 | 2/1965 | Straub | 192/84 B |
| 3,776,332 | 12/1973 | D'Assignies | 188/290 |
| 3,884,335 | 5/1975 | Ashfield et al. | 192/113 B |
| 3,912,060 | 10/1975 | Handke | 192/58 C |
| 3,946,837 | 3/1976 | Houser | 188/271 |

Primary Examiner—Rodney H. Bonck
Assistant Examiner—James J. Merek
Attorney, Agent, or Firm—Pearne, Gordon, Sessions, McCoy, Granger & Tilberry

[57] ABSTRACT

A hydroviscous torque transmitting apparatus of the disc type is disclosed wherein films of fluid are maintained between adjacent discs of a clutch for purposes of torque transmission. Fluid is drawn from a reservoir and supplied to the discs at a positive pressure by a plurality of passageways in a rotating body portion of the clutch. The passageways are constructed and arranged to effectively use the centrifugal pumping potential of the clutch and no separate pump is required for purposes of providing sufficient fluid to the discs to maintain oil shear of hydroviscous operation. Relief flow channels communicating with the passageways are arranged to cause the fluid to open the disc pack when the closing pressure is interrupted and to direct the fluid away from the disc pack. In addition, a fluid reservoir coupling is disclosed for delivery of fluid to the passageways at ambient pressure following the independent pumping of the fluid for some other purpose such as flow through a heat exchanger.

26 Claims, 10 Drawing Figures

TORQUE TRANSMITTING APPARATUS AND METHOD

BACKGROUND OF THE INVENTION AND PRIOR ART

The present invention generally relates to fluid supply systems for torque transmitting apparatus of the disc type wherein films of fluid are provided between adjacent discs of a clutch for purposes of transmitting torque and to a method of converting a dry or wet clutch to provide oil shear or hydroviscous operation and torque transmission.

One of the most widely used means of transmitting torque from one element to another in an industrial type machine is a friction disc type clutch or brake device. Such devices operate to transmit torque between the discs thereof by virtue of a pressure applied to the discs and the frictional characteristics of the discs. The total torque transmitted depends on the number of friction faces involved, the mean radius of the friction faces, the pressure on the discs, and the coefficient of friction between the disc faces.

In most applications, there are occurrences of relative motion between the discs while pressure is being applied to them. Examples of such relative motion include clutch or brake slippage during acceleration or deceleration of one machine member relative to another. An example of continuous slip is a tensioning or speed controlling situation where one machine member continually runs at a rotational rate different from that of a second member while the clutch transmits a regulated amount of torque. In all of these applications, heat is generated at the friction faces of the discs. This heat must be kept within reasonable limits, or there will be a rapid deterioration of the friction faces or other structural clutch damage.

Frequently, clutches or brakes are operated in an oil spray or within a housing containing a fluid which usually comprises an oil so that the discs dip into the fluid as they rotate. Such uses are termed "wet" clutch or brake applications. This is an effective means of keeping disc temperatures down for installations where the clutch or brake is energized to accelerate or decelerate a machine member. In wet applications, a film of fluid is present on the faces of the discs as the clutch or brake closes, and the heat energy is primarily generated in this fluid film. The heated fluid is then squeezed out by clutch pressure, aided by centrifugal forces of the rotating discs, thus carrying heat away from the discs.

In wet applications, the film cooling principle is limited by the amount of fluid that can be contained as a film on the discs when they close or the amount of fluid that can be obtained between the discs when they close. To further increase the heat dissipating capability of such devices, particularly in tensioning or speed controlling applications, it is practical to provide a means of introducing fresh, cool fluid between the discs as they rotate. In such cases, a film of fluid is maintained between the discs.

The prior art discloses that the torque transmitted by such a film of fluid between friction discs is varied or controlled by the axial closing pressure on the discs, which in turn varies the thickness of the film between the discs. In essence, torque is transmitted by the shearing of this fluid film, and torque is increased by increasing the axial closing pressure applied to the discs, and consequently decreasing the thickness of the fluid film between the discs. Since the film heated by the shearing forces is replaced by fresh, cool fluid introduced between the discs, the heat generated is carried away with the displaced fluid. This type of operation is termed "oil shear operation" when the fluid film between discs is reinforced by cool fluid, while the clutch or brake opens and closes and is used to accelerate or decelerate a machine member. In more severe applications where relative slip is continuous, such as tensioning or speed control applications, the process is termed "hydroviscous operation." These two operations are fundamentally similar, except that continuous slip hydroviscous operation requires a higher level of fluid flow; however, a system designed for hydroviscous operation can always be used for oil shear performance.

The maintenance of an adequate supply of fluid to the discs for purposes of assuring hydroviscous operation and dissipation of the heat energy generated during the shearing of the films of fluid between the discs is a primary concern in such hydroviscous torque transmitting units. To that end, the prior art discloses the submersion of the torque transmitting unit within a housing-defined reservoir of oil and the use of pumps to deliver oil to the discs at a positive pressure. In addition, external oil cooling apparatus such as heat exchangers may also be employed in particularly severe applications such as when high cyclic rates, high load inertias, or constant slip are involved.

The use of pumps external to the housing of the unit to deliver oil to the discs involves additional pump drive and control apparatus and frequently entails extensive drilling of a shaft of the unit. Similarly, pumps mounted within the housing unit at a location remote from the torque transmitting unit itself are not entirely satisfactory, since they require additional pump mounting structure and oil lines for delivery of the oil to the discs from the remote location. In resolution of such problems, integrally mounted centrifugal pumps secured directly to a rotating portion of the clutch unit are disclosed in applicant's U.S. Pat. No. 3,912,060, dated Oct. 14, 1975, which is incorporated herein by reference. The integrally mounted pump comprises an annular shroud which encircles the shaft and serves as a pump housing defining an intake port about the shaft. The annular shroud includes radial vanes for pumping oil drawn from the surrounding reservoir through fluid ducts which communicate with the inner portions of the discs.

Other prior art arrangements have used a cavity surrounding the bore or shaft of the clutch, with the cavity connecting to axially extending fluid passages. This cavity arrangement is similar in operation to the previously described pump shroud arrangement, except that the pump shroud design draws fluid from an ambient reservoir, and the cavity arrangement is designed to have cooling fluid introduced through a supply pipe from a separate pumping system. In either case, this requirement of supplying the fluid to the cavity or shroud in the space between the shaft and the central inside opening of the cavity or shroud precludes the extension of the axially extending passages to a location in close proximity within the shaft or bore of the clutch. Space must be left around the shaft to provide an inlet for the supply of fluid.

Assuming given ambient conditions, fluid, discharge head or flow resistance, and pump impeller rotational rate, the characteristics of a centrifugal pump that determine its effective output are: the diameter of the impeller, the internal pump friction, and the flow characteristics including its ability to minimize internal cavitation. The diameter of the impeller establishes a centrifugal pump pressure potential or maximum pressure the pump can develop, and the physical design characteristics determine a centrifugal pump potential or maximum effective pump output or flow rate capability. Herein, an integral centrifugal pump or a passageway pump system are each considered to have a centrifugal pump pressure potential in accordance with their diameters or radius dimensions. Similarly, such integral or passageway pumps are also each deemed to have a centrifugal pump potential or pump flow rate capability in accordance with the overall physical design characteristics of the particular pump.

The integral centrifugal pump is generally sized to maximize the shroud or pump housing diameter in order to maximize the pump capability. Accordingly, the shroud or pump housing of the integrally mounted pump is selected to correspond in size or diameter with the diameter of the rotating portion of the clutch to which it is to be secured. In practice, the maximum pump diameter is that which corresponds with the diameter of the innermost regions of the discs, and the torque transmitting units or clutches of concern herein have a centrifugal pump or pumping potential which is determined by the radial distance from the axis of rotation or shaft bore to the innermost regions of the discs. As indicated, the optimum pump diameter is equal to the diameter of the innermost region of the discs and axially extending fluid ducts are used to deliver the fluid to the discs. In many instances, the pump diameter of an integrally mounted pump is limited by stationary clutch structure located between the shaft bore and the discs, and the fluid ducts will include radially extending portions to reach the discs.

SUMMARY OF THE INVENTION

It has now been discovered that hydroviscous or oil shear operation may be achieved without the use of a separate pump or an integrally mounted pump by more effectively employing the centrifugal pump potential of the torque transmitting unit. The methods and techniques may be used in the original design of improved torque transmitting units or used in the conversion of dry units to wet or hydroviscous units.

In accordance with the present invention, a fluid supply system or passageway pump system is provided comprising a plurality of passageways communicating between a first location adjacent the shaft bore or axis of rotation of the unit for intake of fluid and a radially outward second location for delivery of fluid to the innermost regions of the discs. The passageways are disposed in a rotating portion of the torque transmitting unit or clutch, and they are arranged upon rotation to develop a centrifugal pumping action to draw fluid into the passageways from a supply of fluid and to deliver sufficient fluid to the discs to sustain hydroviscous operation.

In the illustrated embodiments, the passageways extend through a continuously rotating portion of the torque transmitting unit or clutch. Each of the passageways includes an open end adjacent the shaft bore which provides an intake port for fluid and an adjacent passageway portion which extends at an inclined angle with respect to the shaft bore in a radially outward direction toward the discs. The dispostion of the intake port adjacent the shaft bore and the adjacent inclined portion of the passageway have been found to be particularly effective in initially drawing oil into the passageway and establishing full flow conditions. The positioning of the intake port adjacent the shaft bore also minimizes the rotational velocity of the intake port and disposes it at a remote location with respect to the surface of the oil within the reservoir, since the oil at the surface of the reservoir contains relatively large amounts of entrained air.

The initially inclined portions of the passageways are preferably free of abrupt changes in direction and may terminate in an annular oil distributing groove for the final delivery of the oil to the discs. Alternatively, each of the passageways may include a substantially radially extending portion communicating between an initial inclined passageway portion and the discs, if such an arrangement is more convenient in a particular clutch structure. In all cases, the initial inclined portion of the passageway and the disposition of the intake port adjacent the shaft bore have been found to initiate and maintain sufficient flow for purposes of hydroviscous operation.

A relief flow means is provided for opening the disc pack when the closing pressure is decreased in order to reduce the transmitted torque and to vary the rate of the flow of oil to the discs in accordance with the closing pressure applied to the discs. The relief flow means comprises a plurality of relief flow channels or paths which communicate with the passageways, the cross-sectional area of each of the channels being inversely proportional to the closing pressure. The relief flow channels are defined in part by a movable portion of the clutch structure which operates to close the disc pack. Accordingly, the oil flow through the passageways serves to displace the movable clutch portion from its torque transmitting position upon reduction of the closing pressure and to simultaneously increase the cross-sectional area of the channels.

In those applications wherein it is not desired to submerge the torque transmitting unit or clutch in an oil reservoir, a fluid reservoir coupling for delivery of oil at ambient pressure to the intake ports is provided. The coupling is constructed to assure that a sufficient supply of fluid is maintained at the intake ports and that the fluid is not forced into the passageways at an independent pressure or flow rate so as to interfere with the fluid flow rate established by the passageways as well as the desired spacing between the discs.

As shown in the illustrated embodiments, the present invention enables the elimination of separate or additional pump structures in the torque transmitting units and allows hydroviscous operation to be obtained by appropriate construction and arrangement of the passageways. The economies of eliminating the pump are apparent, especially in view of the fact that in many designs no loss in the heat dissipating ability of the unit results and, most surprisingly, actual increases in the heat dissipating ability have been obtained. Further, the conversion of a standard dry clutch to provide a hydroviscous unit is facilitated, since the elimination of the pump also enables the elimination of special pump mountings and/or controls. It should be appreciated that the teachings of the present invention are applicable to hydroviscous brake units as well as drive units.

DETAILED DESCRIPTION OF THE DRAWINGS

Figure 1:
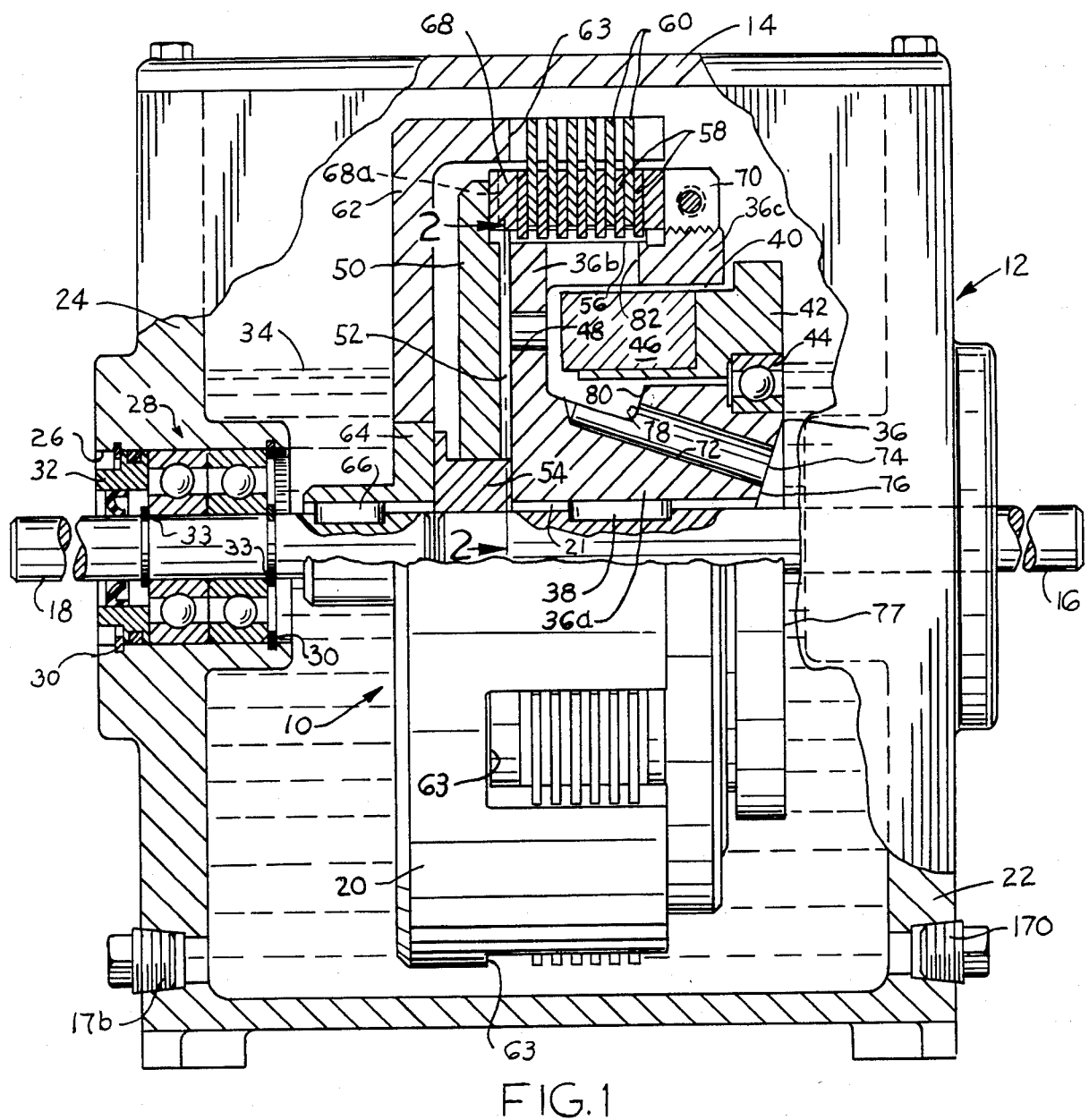
FIG. 1 is an elevational view, partially in section, of a torque transmitting unit comprising a clutch provided with fluid supply means in accordance with the present invention, the torque transmitting unit being submerged in a housing defined reservoir of oil.

Referring to FIG. 1, there is shown a torque transmitting unit 10 mounted within a housing 12 having a removable top cover 14. The torque transmitting unit 10 is arranged to receive an input shaft 16 and an axially aligned output shaft 18 which are operatively connected by means of an electromagnetic clutch 20 having a clutch shaft bore 21. The input torque to the unit may be provided by connection of the input shaft 16 which is received within the shaft bore 21 to any suitable prime mover, such as an electrical motor (not shown).

The shafts 16 and 18 are respectively provided with outboard bearing supports in or on oppositely disposed walls 22 and 24 of the housing 12. The bearing support provided for each of the shafts is identical, and only that provided for the shaft 18 is shown. The shaft 18 extends through a bore 26 in the wall 24 of the housing 12, and it is supported in the bore by a bearing assembly 28. The bearing assembly 28 includes a double row ball bearing together with snap rings 30 and 33 arranged to restrain axial movement of the shaft and an oil seal 32, which provides a seal between the bore 26 and the shaft 18.

The clutch 20 is a hydroviscous clutch wherein the torque is transmitted by a film of fluid or oil maintained between the adjacent discs and, more particularly, the rate of shear of film between the adjacent discs. To that end, a supply or reservoir of oil 34 is maintained within the housing 12 for delivery to the discs, as described below in greater detail.

The clutch 20 includes a continuously rotating clutch body 36, which is connected to the input shaft 16 by a key 38. The clutch body 36 includes a central hub 36a, a radially extending wall 36b, and an axially extending wall 36c, which cooperate to define an annular opening 40 in which the coil carrier 42 is mounted. The coil carrier 42 is stationary, and an annular bearing assembly 44 is disposed between the coil carrier 42 and the clutch body 36. As discussed below in detail, the practical centrifugal pump pressure potential of the clutch 20 is limited by the stationary coil structure.

A coil 46 is mounted on the coil carrier 42 and a plurality of openings 48 are provided in the radial wall 36b for establishing the north and south magnetic fields. Accordingly, an armature plate 50 is mounted adjacent the radially extending wall 36b and axially spaced therefrom by an air gap 52. The armature plate 50 is journaled on the input shaft 16 by means of a bushing 54.

The clutch body 36 is provided with gear teeth 56 splined with inner drive discs 58. Interleaved with the drive discs 58 are outer driven discs 60 which are arranged to engage a drive cup or spider 62. To that end, the outer driven discs 60 extend through peripherally spaced openings 63 in the drive cup 62. The drive cup 62 is connected to the output shaft 18 by means of a collar 64 and a key 66. The collar 64 is press-fitted and welded into a central bore in the drive cup 62 for rotational movement therewith.

The axial proximity of the interleaved discs 58 and 60 or disc pack is controlled by the armature plate 50 acting through a pressure ring 68 to axially compress the disc pack against an adjustable stop 70 carried by the clutch body 36. For the reasons discussed below, a series of slots or recesses 68a radially extends through the pressure ring 68.

The excitation of the coil 46 sets up a magnetic flux circuit which attracts the armature plate 50, causing it to axially move to the right as shown in FIG. 1, so as to close the spacing between the discs 58,60 and thereby increase the transmitted torque. Accordingly, adjustment of the voltage in the coil 46 regulates the attraction of the armature plate 50, the frictional fluid engagement of the discs 58 and 60, and the output torque of the unit.

The torque transmitting unit 10 may be used to dissipate heat generated while accelerating or decelerating the relative rotational rate of the interleaved discs 58 and 60, or may be used in tensioning situations where the outer driven discs 60 are continually operated at a rotational rate either faster or slower than drive discs 58, while transmitting or adjusting transmitted torque by electrical energization of coil 46.

The torque transmitting unit 10 may also be operated as a variable speed drive by monitoring the rotational speed of the output shaft with conventional control means to provide a feedback signal or voltage which is compared with a preselected set-point signal or reference voltage in a servo control system (not shown). Any deviation in the compared voltages results in an error signal which increases or decreases the voltage in the coil 46 to regulate the axial proximity of the discs 58 and 60 and the output speed of the unit.

The torque transmitting unit 10 may be operated as a brake by securing the cup 62 against rotation as by connection to the housing 12, omitting the input shaft 16 and extending the output shaft 18 through the entire unit 10 for support thereof. The output shaft 18 is only keyed to the clutch body 36 in a brake application of the unit 10, and a conventional control system is used.

Figure 2:
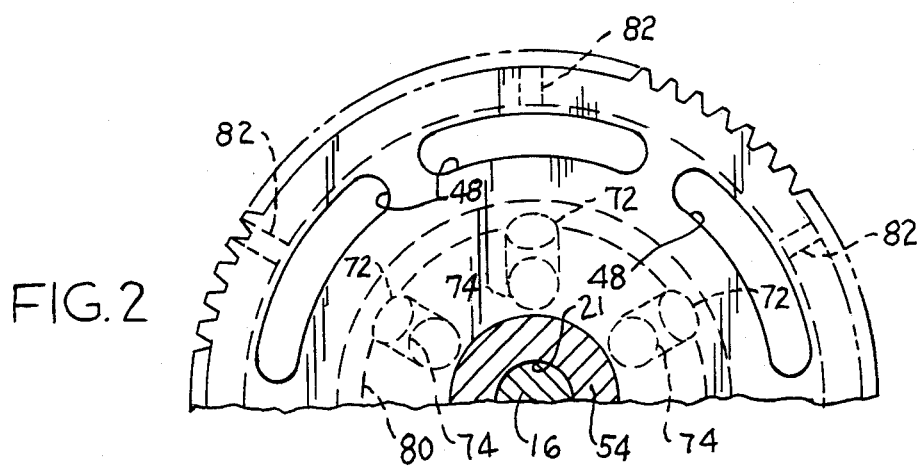
FIG. 2 is an elevational view taken along the line 2—2 of FIG. 1, with parts being omitted for purposes of illustration.

With particular reference to FIGS. 1 and 2, a passageway pump system comprising a plurality of passageways 72 is shown. More specifically, the clutch body 36 includes six equally angularly spaced passageways 72, three of the passageways being shown in FIG. 2, for purposes of delivering oil to the discs 58 and 60.

Each of the passageways 72 extends at an inclined angle with respect to the clutch shaft bore 21 from an intake port 74 located at a first radial location adjacent the bore 21. The intake port 74 comprises an axially outboard, open end of the passageway 72, and it is preferably located at a radially inward position as close to the shaft bore 21 as possible.

As shown in FIG. 1, the axially outboard surface of the clutch body 36 may be provided with a conical recess 76 adjacent the bore 21 for ease of fabrication of the passageway 72 which extends at right angles to the surface of the recess 76 in the embodiment of FIG. 1. The recess 76 extends axially inwardly into the continuously rotating clutch body 36 to provide an inclined wall which is offset from the radial end face 77 of the clutch 20. The disposition of the passageway 72 at a right angle to the surface of the recess 76 avoids bends or changes in direction of the passageway which cause fluid friction and cavitation. This tends to enhance the intake of fluid into the passageways 72 and to promote the pumping operation.

Each of the passageways 72 terminates at an outlet port 78 within an annular oil distributing groove 80 which extends about the entire periphery of the central hub 36a and assures uniform distribution of the oil to the discs 58, 60. The oil is delivered to the groove 80 under pressure as a result of the centrifugal pumping action of the passageways 72. The oil flows from the groove 80 through the space between the radial wall 36b and the coil 46, and then through an opening 82 in the axial wall 36c for delivery to the innermost radial extent of the discs 58,60. There is no substantial flow of oil through the opening 48 during torque transmission since the closing of the discs by the axial movement of the armature plate 50 reduces the axial dimension of the air gap 52 to a few thousandths of an inch. The axial dimension of the air gap 52 is exaggerated in FIG. 1 for clarity of illustration.

During the torque transmitting operation of the unit 10, the primary oil flow is as described above. When the transmission of torque is to be interrupted by de-energizing the coil 46, the pressure at which the oil is delivered by the passageways 72 into the groove 80, and more specifically into the openings 48, is sufficient to axially bias the armature plate 50 to the left, as shown in FIG. 1. The axial displacement of the plate 50 enables the axial spacing of the discs 58,60 to more rapidly increase and terminate the transmission of torque. Further, the oil flow is vented away from the discs 58,60 to minimize the residual driving torque otherwise resulting from an excessive accumulation of oil in the discs. More particularly, the axial displacement of the plate 50 to the left significantly enlarges the width of the air gap 52 and the rate of oil flow through the openings 48 increases. The oil then flows from the groove 80 through a plurality of relief flow channels or paths defined by the openings 48, the air gap 52, and the slots 68a in the pressure ring 68. The foregoing relief flow channels provide a larger cross-sectional area and less resistance than the openings 82 and discs 58,60. Accordingly, the oil will tend to primarily flow through the relief flow channels upon interruption of torque transmission with displacement of the armature plate 50 to enlarge the air gap 52. It should be appreciated that the passageways 72 deliver a substantial supply of oil to the groove 80, and that the oil is automatically directed to the discs 58,60 during torque transmission or vented through the relief path when torque transmission is interrupted.

Figure 3:
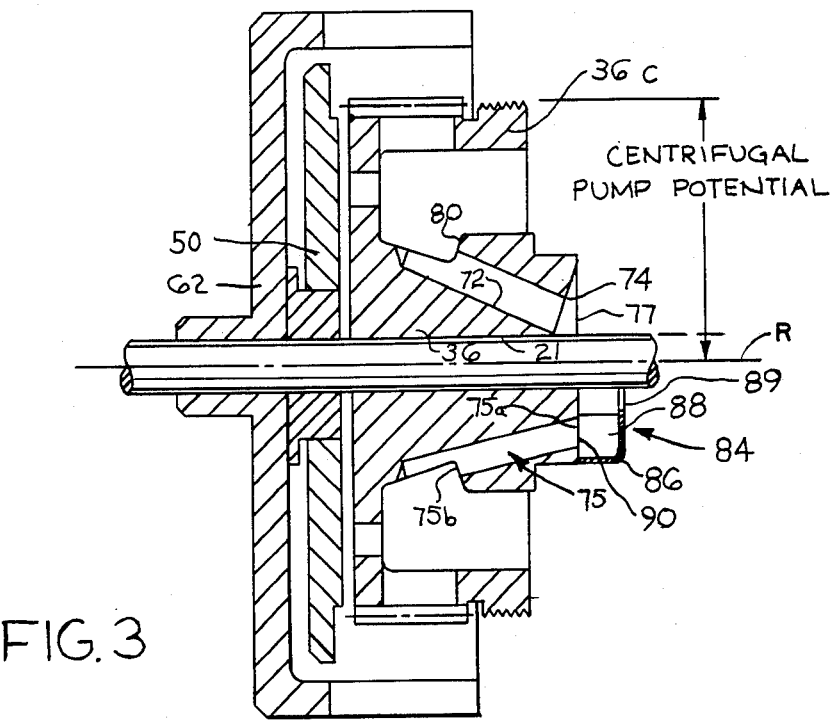
FIG. 3 is a schematic, sectional view showing a continuously rotating portion of the clutch of FIG. 1 and a passageway extending therethrough, the lower portion of the figure showing the prior art use of a pump for purposes of comparison.

Referring to FIGS. 1 and 3, the clutch body 36, armature plate 50, and drive cup 62 are schematically illustrated, together with the passageways 72, and the maximum possible centrifugal pump potential is reflected by the radial distance from an axis of rotation indicated by line R to the innermost radial extent of the discs 58,60 adjacent the outer peripheral surface of the axial wall 36c. In view of the stationary coil carrier 42 (FIG. 1), it should be appreciated that the practical centrifugal pump potential of the clutch 20 is limited to a radial distance substantially corresponding to the radius of the central hub 36a of the clutch body 36. In connection with the passageways 72, the pumping capability of the clutch 20 is determined by the radial extent of the clutch body 36 which is available for effectively confining the oil to allow centrifugal force to act on the oil for delivery thereof to the discs.

The upper portion of FIG. 3 corresponds with the pump structure shown in FIG. 1. For purposes of comparing the effectiveness of the passageways 72 with prior art techniques using an integrally mounted centrifugal pump, the lower portion of FIG. 3 shows the torque transmitting unit 10 modified to include a centrifugal pump 84 which comprises an annular shroud 86 which serves as a pump housing and defines a pump intake port 89 about the input shaft 16. Intake port 89 is selected to be an optimum diameter for the required flow rates, allowing the most practical opening around shaft 16. Coincidentally, the diameter of pump 84, optimized to provide best flow rates, corresponds closely with the diameter of the central hub 36a, thus providing the maximum practical pressure potential.

The optimized pump design is provided with radially extending vanes 88 and discharge ports 90. Six equally spaced, angular passageways 75 are constructed, of the same diameter as the passageways 72, as illustrated in the upper half of FIG. 3. Each of the passageways 75 extends from a passageway entrance 75a radially outward at an inclined angle with respect to the clutch shaft, to an outlet port 75b within the distributing groove 80. The outlet ports 75b are located at the same radius from the axis of rotation as the outlet ports 78.

In comparing the operation of the torque transmitting unit 10 with and without the centrifugal pump 84, the output shaft 18 of the unit was locked to simulate a stalled, condition. The clutch was then energized to develop rated torque, and the input RPM was varied upwardly until the maximum rated horsepower was applied. A cooling coil was disposed in the reservoir of oil 34 and the temperature rise or differential of the oil between the discs 58 and 60, as measured at the outer peripheral edge of a locked driven disc 60 just as the oil was expelled from between the discs, over the temperature of the reservoir of oil 34 was monitored with a thermocouple.

Figure 4:
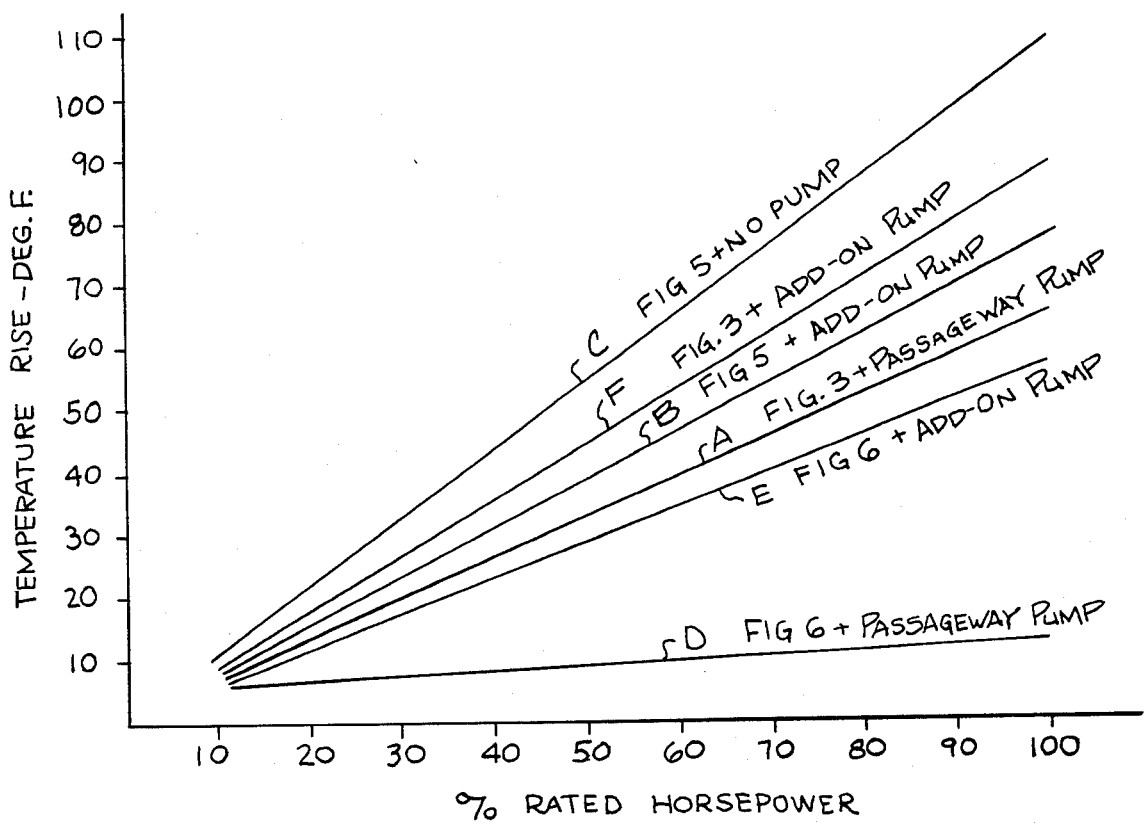
FIG. 4 illustrates the relationship between the temperature rise of the discs of torque transmitting units having their output shafts stalled and operated with and without separate pump units at the indicated percentages of rated horsepower.

The relationship between the temperature rise and the percent rated horsepower is shown in FIG. 4 for the torque transmitting unit 10 and the modified unit having a separate pump by curves A and F. Operation with the inclined passageways having the inlet ports 74 adjacent the input shaft 16 resulted in a temperature rise of 66° F. over the temperature of the reservoir as shown by curve A in FIG. 4. Operation with inclined passageways 75 cooperating with centrifugal pump 84, as shown in the lower portion of FIG. 3, resulted in a temperature rise of 88° F. over the temperature of the reservoir, as shown by curve F in FIG. 4. Accordingly, the heat dissipating ability of the torque transmitting unit 10 was superior when the inclined passageways 72 were provided with inlet ports adjacent the input shaft 16, as illustrated in the top portion of FIG. 3, as compared to inclined passageways 75 cooperating with centrifugal pump 84. As shown in the lower portion of FIG. 3, it is not possible to extend the passageways 75 to a location in close proximity to the input shaft 16 because of the inlet requirements of centrifugal pump 84. To a large degree, the effectiveness of the passageways 72 to provide sufficient centrifugal pumping and oil flow to sustain hydroviscous operation is believed to be associated with the initially inclined portion of the passageways and the disposition of the intake ports 74 adjacent the shaft bore 21 for direct receipt of fluid from the surrounding reservoir.

Figure 5:
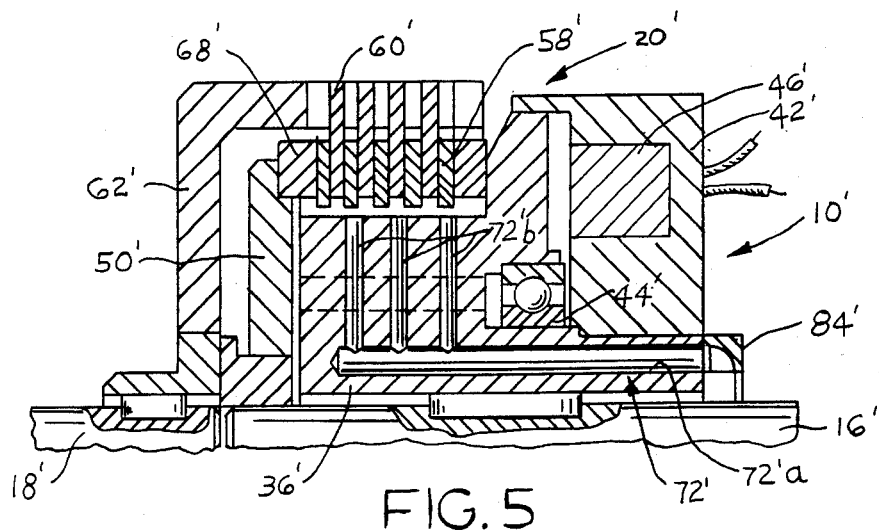
FIG. 5 is a sectional view similar to FIG. 1, showing a portion of a torque transmitting unit including an integrally mounted centrifugal pump in accordance with the prior art.

Referring to FIG. 5, a torque transmitting unit having a slightly modified structure is shown for purposes of comparing its operation with and without the separate centrifugal pump and demonstrating the effectiveness of the initially inclined portion of the passageways. For purposes of convenience, comparable parts of the unit shown in FIG. 5 are identified with the same reference numerals as used in the first embodiment, with the addition of a prime designation. Accordingly, the torque transmitting unit 10' includes an input shaft 16' and an output shaft 18', which are connected by means of a hydroviscous, electromagnetically actuated clutch 20'.

The clutch 20' includes a continuously rotating clutch body 36', which is keyed to the input shaft 16', an annular bearing assembly 44', and a stationary coil carrier 42' supporting a stationary coil 46'. An armature plate 50' is arranged to operate on the interleaved discs 58',60' through a pressure ring 68', and the output torque is transferred to the output shaft 18' through a drive cup or spider 62'.

In the torque transmitting unit 10', six equally angularly spaced passageways 72' are again employed. However, the passageways 72' do not include an initially inclined portion but, rather, they each include an axially extending initial portion 72'a communicating with a plurality of radially extending passageways 72'b.

The torque transmitting unit 10' was operated with and without a centrifugal pump 84', in the same manner as described above with respect to the unit 10, and the resulting relationships between temperature rise and the percent rated horsepower are shown in FIG. 4 by curves B and C. In this instance, operation with the pump 84' resulted in a temperature rise of about 78° F. at 100% of the rated horsepower, as shown by curve B in FIG. 4, and operation without the pump 84' resulted in a temperature rise of about 110° F., as shown by curve C. It is apparent from curves A, B and C that the passageways 72 should include an initially inclined portion, as a maximum temperature rise of about 100° F. over the temperature of the supplied fluid is considered a practical design limitation since it is desirable to operate at the lowest possible temperatures.

As indicated above, the passageways 72 should have an inclined initial portion in order to assure sufficient centrifugal pumping action and hydroviscous operation. Further, it is preferred that the intake ports 74 of the passageways be located adjacent the shaft bore 21 in order to minimize the rotational velocity of the intake ports 74 for enhancing the drawing of oil into the passageways 72. It is also desirable that the intake ports 74 be located at a position remote from the surface of the oil reservoir 34, since the oil at the surface contains a relatively large amount of entrained air.

Figure 6:
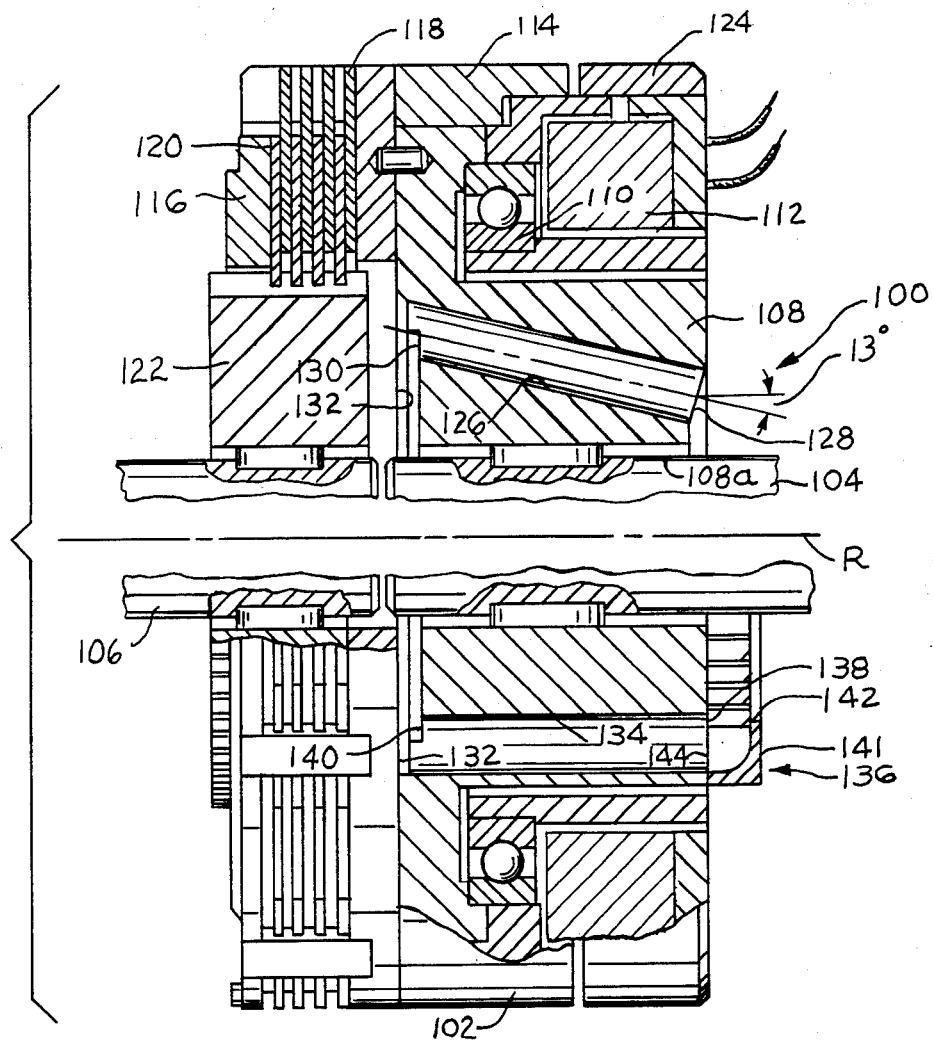
FIG. 6 is a sectional view similar to FIG. 1 showing another embodiment, the lower portion of the figure showing the use of a prior art pump for purposes of comparison.

The effectiveness of the inclined passageways and the desirability of using the full centrifugal pump potential is particularly illustrated by the torque transmitting unit 100 shown in FIG. 6. The operation of the torque transmitting unit 100 provided with passageways in accordance with the present invention as shown in the upper portion of FIG. 6 was compared with its operation using a separate, integral centrifugal pump in accordance with prior art techniques as shown in the lower portion of FIG. 6. The structure and operation of the unit 100 are similar to the units previously described and the unit 100 is only briefly described below.

The torque transmitting unit 100 includes an electromagnetic clutch 102 which is arranged to transmit torque between an input shaft 104 and an output shaft 106. The input shaft 104 is keyed to a continuously rotating clutch body 108 and a bearing assembly 110 is provided for mounting a stationary coil 112. An armature 114 is connected to a pressure plate 116 for controlling the transmission of torque and the axial proximity of interleaved drive discs 118 and driven discs 120. The driven discs 120 are engaged with a drive gear 122 which is keyed to the output shaft 106. Accordingly, upon excitation of the coil 112, a magnetic flux circuit attracts the armature 114 towards an outer field ring 124, causing the pressure plate 116 to close the axial spacing of the interleaved discs 118, 120 and to provide the hydroviscous transmission of torque.

As shown in the upper portion of FIG. 6, the torque transmitting unit 100 was provided with six equally angularly spaced passageways 126 extending through the clutch body 108. Each of the passageways 126 extends at an inclined angle of 13° with respect to the clutch shaft bore 108a and the rotational axis of the clutch indicated by the line R in FIG. 6.

Each of the passageways 126 includes an intake port 128 which is disposed at a radially inward location adjacent the bore 108a. Each of the passageways 126 also includes an outlet port 130 located within an annular recess 132 in the clutch body 108. The annular recess 132 is located adjacent the axial inboard face of the drive gear 122 and it cooperates therewith to uniformly distribute the oil to the discs 118, 120.

For purposes of comparing the effectiveness of the passageways 126 with prior art techniques using an integrally mounted centrifugal pump, the torque transmitting unit 100 was structurally modified to provide the structure shown in the lower portion of FIG. 6. To that end, six equally angularly spaced axial passageways 134 were provided in the clutch body 108 and a separate centrifugal pump 136 was also mounted to the clutch body 108. The passageways 134 are of the same cross-sectional area as the passageways 126, and each of the passageways 134 includes an intake port 138 and an outlet port 140 opening into the annular recess 132. For purposes of comparison, the outlet ports 130 and 140 were disposed at equal radial distances from the shaft bore 108a and axis of rotation R.

The centrifugal pump 136 is of an empirically optimized design to provide a maximized flow of oil and cooling of the discs 118, 120 during hydroviscous or oil shear operation. The pump 136 includes an annular shroud 141 which defines a pump intake port 142 about the shaft 104. The pump 136 also includes a plurality of radially extending vanes and pump outlet ports 144 which are aligned with the passageway intake ports 138. In accordance with prior art techniques, the centrifugal pump 136 is provided with a maximized diameter in view of stationary clutch structure and the passageways 134 extend in an axial direction for communication with the annular recess 132.

As in the comparisons described above with respect to the embodiments of FIGS. 3 and 5, the operation of the torque transmitting unit 100 having passageways 126 in accordance with the present invention, as shown in the upper portion of FIG. 6, was compared with the use of a separate centrifugal pump as shown in the lower portion of FIG. 6. In each instance, the output shaft 106 of the unit 100 was locked to simulate a stalled condition. The clutch was then energized to develop rated torque, and the input RPM was varied upwardly until the maximum rated horsepower was applied. The temperature differential of the oil between the discs 118 and 120, as measured at the outer peripheral edge of a locked driven disc 120 just as the oil was expelled from between the discs, over the temperature of the reservoir of oil was monitored.

The relationships obtained are again shown in FIG. 4 wherein curve D reflects operation with the passageways 126 and curve E represents operation with the passageways 134 and pump 136. As shown by curve D, the inclined passageways 126 resulted in a maximum temperature rise of 13° F. at 100% of the rated horsepower of the unit 100 as compared with a 58° F. temperature rise obtained with the use of axial passageways 134 and pump 136 as shown by curve E. Thus, the elimination of the pump 136 and the inclination of the passageways 126 actually resulted in a decrease in the temperature rise.

The pressure capacities at the outlet ports 130 and 140 are equal when the two designs of FIG. 6 are rotated at identical rotational speeds, since the centrifugal pump 136 and the outlet ports 130 and 140 are provided with a maximized diameter and the outlet ports 130 and 140 are disposed at equal radial distances from the shaft bore 108a and axis of rotation R. Accordingly, the improved performance or lower temperature differential of the design with inclined passageways 126 is believed to be due to an improvement of the flow characteristics including decreases in internal friction and cavitation. Consequently, the inclined passageway design provides more efficient flow characteristics and increased flow rates.

In this type of clutch cooling system, a practical limit for the allowable cooling oil temperature rise is 100° F. With this rise, the required flow in order to support continuous heat dissipation is 0.1 gallon per minute, per horsepower, of an oil with an approximate specific heat of 0.5. In this particular test, the absolute flow rate of oil for the design illustrated in the upper portion of FIG. 6, using inclined ports 126, was 1 gallon per minute, while the flow rate using the design illustrated in the lower portion of FIG. 6, using the centrifugal pump, was 0.23 gallon per minute. Thus, the flow rate in the first case was about 4.3 times greater.

The flow rate of a hydroviscous pump system is important in establishing a rating for such a torque transmitting unit. The flow rate must be sufficient to maintain a film of fluid between adjacent discs which extends over the contact area or frictional fluid engagement area of the discs. For a given torque transmitting unit, with a given total contact area between the driving and driven discs, the higher the flow rate, the lower the operating temperature levels of the system. Or, since the rated capacity of the unit is largely based on operating temperatures, it follows that with a given torque transmitting unit, with a given disc contact area, high flow rates may be associated with increased levels of horsepower dissipated per square inch of disc contact area. In the case of torque transmitting unit 100, for the arrangement as illustrated in the lower portion of FIG. 6, using the centrifugal pump 136 and axial passageways 134 at maximum output, the horsepower dissipated per square inch of contact area between discs 118 and 120 was 0.0019 for each degree Fahrenheit of temperature difference between the ambient oil and the heated oil as it was displaced and expelled from between the discs 118 and 120. Tests of various sizes of torque transmitting units using pump arrangements similar to centrifugal pump 136 and axial passageways 134 indicate that this value is typical.

In the case of torque transmitting unit 100, for the arrangement as illustrated in the upper portion of FIG. 6, using inclined passageways 126, at maximum output, the horsepower dissipated per square inch of contact area of the discs 118 and 120 was 0.0086 for each degree of Fahrenheit of temperature difference between the ambient oil and the heated oil as it was expelled. Tests of various sizes of transmitting units using inclined passageways 126 indicate that this value is typical. Thus, as compared with optimized prior art integral pump arrangements, the passageway pump systems of the present invention provide improved heat energy dissipation with typical values ranging from 0.0019 to 0.0086 horsepower per square inch of contact area, or approximately from about 0.002 to about 0.009 horsepower per square inch of contact area.

Figure 7:
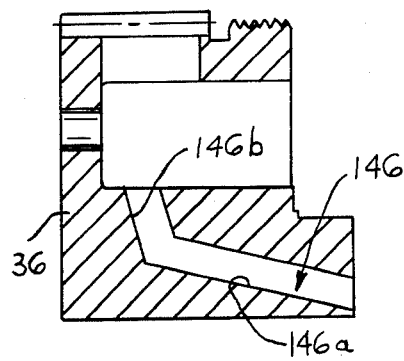
FIG. 7 is a schematic, sectional view showing the continuously rotating body portion of the clutch of FIG. 1 having a modified passageway including an initially inclined portion and a communicating, radially extending portion.
Figure 8:
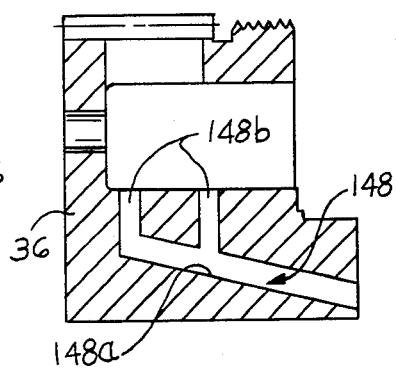
FIG. 8 is a schematic view similar to FIG. 7, showing a passageway including an inclined portion and a plurality of communicating, radially extending portions.
Figure 9:
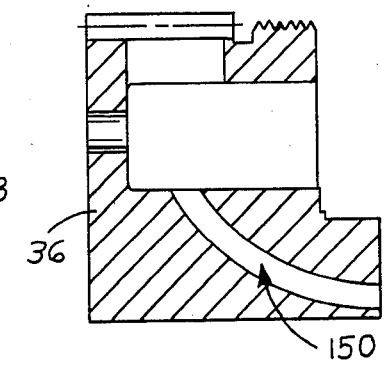
FIG. 9 is a schematic view similar to FIG. 7, showing a passageway having an arcuate configuration.

Referring to FIGS. 7 through 9, a number of further embodiments having modified passageway configurations are shown with the use of the rotating clutch body 36 of FIG. 1. In each instance, a single passageway is shown; however, it should be appreciated that a number of equally angularly spaced passageways would generally be employed. The embodiments of FIGS. 7 through 9 reflect various design considerations in providing the passageways as discussed below.

Referring to FIG. 7, a passageway 146, including an initially inclined portion 146a communicating with a substantially radially extending portion 146b, is shown extending through the clutch body 36. The passageway 146 is of a maximized cross-sectional area which tends to provide increased pumping flow rates. In certain clutch structures, it may be more convenient to increase the overall pumping flow rate by the use of a greater number of passageways as opposed to a fewer number of passageways of larger cross-sectional area. In either instance, it has been found that sufficient or even improved pump flow rates can be provided by effective use of the centrifugal pump potential of the particular torque transmitting unit by providing passageways in accordance with the present invention.

The pumping flow rate also increases with the steepness of the angle of the inclined portions of the passageways in accordance with the centrifugal forces imposed upon the oil within the passageways. The steepness of the initial inclined portion and the centrifugal pumping action developed must be selected to assure that oil is drawn into the passageways at a rate which is sufficient to maintain hydroviscous operation.

Referring to FIG. 8, a passageway 148, including an initially inclined portion 148a communicating with two radially intersecting portions 148b, is illustrated in the clutch body 36. In this instance, the initially inclined portion 148a will establish a sufficient flow of oil to assure that each of the portions 148b receives an ample supply of oil and delivers the same at axially spaced locations adjacent the rotating disc pack. The relative cross-sectional areas of the passageway portions 148a and 148b may be varied in order to provide an optimum distribution of oil along the axial extent of the disc pack.

Referring to FIG. 9, an arcuate passageway 150 is shown extending through the clutch body 36. The arcuate passageway 150 reflects an optimum flow design for the passageway comprising a slow sweeping curve which does not impose abrupt changes in the direction of flow through the passageway.

It should be appreciated that various features of the passageways 146, 148 and 150 can be combined in accordance with general teachings herein. Each of the illustrated passageways is in a single plane which enables effective pumping action regardless of the direction of rotation of the clutch body, this being particularly desirable in reversible drive systems. In the absence of a reversible operation requirement, the passageways may be made unidirectional, as by spiraling the passageways 150 in the direction of rotation for improved pumping ability.

The provision of passageways in accordance with the present invention enables a standard dry or wet clutch to be initially or subsequently modified for hydroviscous or oil shear operation without the addition of a separate pump unit. More particularly, it is only necessary to provide passageways in a continuously rotating portion of the clutch to utilize the centrifugal pump potential and to assure that the passageways communicate with the disc pack. The reduction in abrupt torque loadings in hydroviscous operation as compared with dry or wet operation enables the use of smaller diameter shafts in view of the reduced loading requirements. Accordingly, the clutch shaft bore may in turn be reduced in size so as to increase the centrifugal pump potential and the steepness of the initially inclined portion of the passageways. Consequently, the improvements herein may be advantageously employed in both initial design and subsequent conversion of standard dry or wet torque transmitting units to hydroviscous operation.

Figure 10:
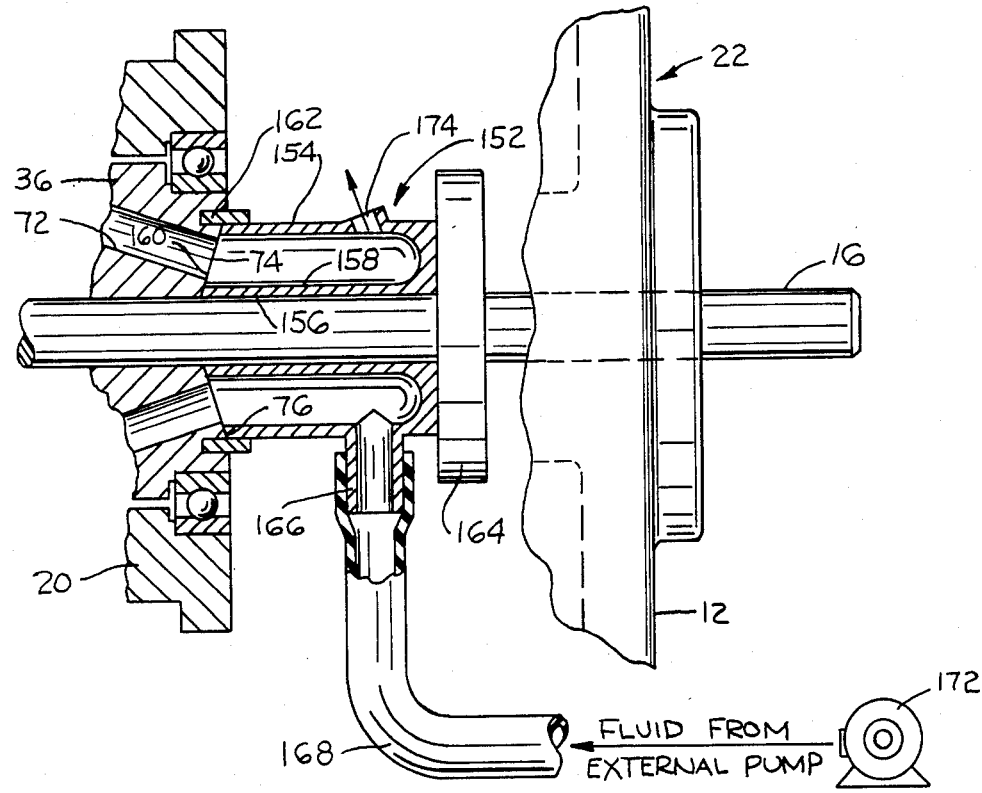
FIG. 10 is a fragmentary view, partially in section, showing the torque transmitting unit of FIG. 1 having a fluid reservoir coupling mounted thereto in accordance with the present invention, the housing-defined reservoir of oil being eliminated.

Referring to FIG. 10, the torque transmitting unit 10 of FIG. 1 is shown with modifications to include a fluid reservoir coupling 152. The coupling 152 is employed when it is not desired to maintain a reservoir of oil 34 within the housing 12 even though the torque transmitting unit 10 is to be hydroviscously operated. To that end, the coupling 152 is used to deliver and maintain at ambient or atmospheric pressure a sufficient supply of oil to the intake ports 74 of the passageways 72.

The coupling 152 includes a rotationally stationary reservoir cup 154 having a longitudinal shaft bore 156 through which the input shaft 16 extends. The cup 154 includes an annular reservoir chamber 158 extending around the shaft 16 and having an open end 160 in communication with the intake ports 74 of the passageways 72. A rotating annular seal 162 is press fitted within a circular groove in the clutch body 36 and forms a sliding, fluidtight seal with the outer peripheral surface of the cup 154. The coupling 152 is axially maintained adjacent the conical recess 76 in the clutch body 36 by a clamp collar 164 secured to the input shaft 16 in abutting relationship with the closed end of the coupling 152.

The oil is delivered to the coupling 152 through an inlet port 166 connected to an oil line 168 which extends through the wall 22 of the housing 12. For example, the oil line 168 may extend through the opening provided by removal of the threaded plug 170 (FIG. 1) and the use of a suitable seal (not shown). The oil flow through the line 168 is maintained by an external pump 172 which may be connected to an oil supply or the output of a heat exchanger (not shown).

The oil is maintained in the annular reservoir chamber 158 at ambient pressure by means of a pressure relief vent 174 which is open to the interior of the housing 12. Accordingly, the rotating passages 72 draw oil in accordance with their design into the intake ports 74 from the reservoir chamber 158, and any excess oil overflows through the vent 174. As shown in FIG. 10, the vent 174 is disposed at an angularly remote location from the inlet port 166 in order to assure that a full and adequate supply of oil is maintained at ambient pressure within the reservoir chamber 158. Consequently, it is not necessary to match the flow rate of the external pump 172 with that developed by the passageways 72, and the design of the passageways will be effective in controlling the amount of oil delivered to the discs 58, 60.

The excess oil flowing through the vent 174, as well as the oil passing between the discs 58, 60 of the clutch 20, or through the relief flow channels so as to be vented out the slots 68a in the pressure ring 68, flows to the bottom of the housing 12. The oil is continuously drained from the housing as by means of removal of the threaded plug 176 (FIG. 1) for purposes of connecting the housing 12 to a drain line (not shown) which will return the oil to the pump 172 or the inlet of an external heat exchanger (not shown). Accordingly, the coupling 152 enables hydroviscous operation of the torque transmitting unit 10 without submerging the unit within a reservoir of oil. The coupling 152 also contributes to the pumping efficiency of the passageways 72, since it reduces the agitation of the oil and entrainment of air.

Although preferred embodiments of this invention have been shown and described, it should be understood that various modifications and rearrangments of the parts may be resorted to without departing from the scope of the invention as disclosed and claimed herein.

What is claimed is:

1. A torque transmitting unit of the disc type wherein films of fluid are maintained between adjacent disc means for purposes of torque transmission, comprising first disc means adapted to be operatively connected to an input shaft received within a central shaft bore extending along an axis of rotation and second disc means adapted to be operatively connected to an output element, closing means for controlling the relative axial proximity of said first and second disc means to thereby control the thickness of fluid films between adjacent disc means and the transmission of torque, a housing for confining fluid and providing a reservoir of fluid, a rotating portion extending into said reservoir of fluid, and fluid supply means adapted to continuously deliver fluid from said reservoir of fluid to the innermost extent of said disc means, said fluid supply means comprising a plurality of passageways in said rotating portion of said torque transmitting unit, each of said passageways extending from a first location adjacent said shaft bore for intake of fluid to a radially outward second location for delivery of fluid to said disc means, each of said passageways including an inclined portion extending from an intake port adjacent said first location to said second location for delivery of fluid to said disc means, said inclined portion comprising a major extend of said passageways said inclined portion of said passageway being disposed at a sufficiently steep inclined angle with respect to said shaft bore to draw fluid into said passageway directly from said reservoir of fluid at said first location due to the centrifugal pumping action developed upon rotation of said rotating portion of said torque transmitting unit, said inclined angle being of substantially constant slope, said inclined portion being substantially free of abrupt changes in direction, and said intake port being located immediately adjacent said axis of rotation in a transversely extending wall of said rotating portion to minimize internal fluid friction and cavitation within said fluid supply means and cause said passageways to provide a pumping capacity sufficient to sustain oil shear or hydroviscous operation.

2. A torque transmitting unit as set forth in claim 1, wherein said intake port comprising an open end of said passageway adjacent said first location.

3. A torque transmitting unit as set forth in claims 1 or 2, wherein said intake ports are formed in a conical surface portion in said transversely extending wall.

4. A torque transmitting unit as set forth in claim 1, wherein said disc means has a contact area over which said fluid films extend, and said passageways are also constructed and arranged to provide a pumping capacity sufficient to dissipate heat energy in an amount in excess of about 0.002 horsepower per square inch of contact area, for each degree Fahrenheit of temperature differential between the fluid entering said passageways from said source of fluid and the temperature of the heated fluid expelled from between the discs, said energy generated by relative rotation between said first and second disc means when said second disc means is locked against rotation.

5. A hydroviscous torque transmitting unit as set forth in claim 1, wherein each of said passageways terminates at an annular fluid distributing means located at said second location, said annular fluid distributing means being adapted to uniformly distribute fluid about the entire inner periphery of said discs.

6. A torque transmitting unit as specified in claim 1, wherein said fluid has a specific heat of substantially 0.5 and said pumping capacity is sufficient to supply approximately 0.001 gallon per minute of said fluid for each horsepower of energy to be dissipated with a temperature differential not exceeding one degree Fahrenheit for each horsepower of energy as measured between said disc means and the temperature of the heated fluid as it leaves said disc means.

7. A torque transmitting unit according to claim 1, wherein each of said passageways has a radial extent substantially corresponding with the radial distance between the innermost extent of said torque transmitting unit and the innermost extent of said disc means whereby said passageways upon rotation provide a centrifugal pumping pressure substantially corresponding with the centrifugal pump pressure potential of said torque transmitting unit.

8. A torque transmitting unit according to claim 1, wherein an axially extending recess is provided in said transversely extending wall of said rotating portion of said torque transmitting unit at said first location.

9. A torque transmitting unit according to claim 1, wherein an axially extending recess is provided in said transversely extending wall of said rotating portion of said torque transmitting unit at said first location and each of said passageways terminates at an opening in a wall of said recess to provide said intake port.

10. A torque transmitting unit according to claim 1, wherein said transversely extending wall of said rotating portion of said torque transmitting unit includes an axially inwardly inclined surface at said first location and at least one of said passageways is disposed at a right angle to said inclined surface, and said at least one passageway terminates at an opening in said surface to provide said intake port.

11. A torque transmitting unit according to claim 1, wherein each of said passageways extends at a right angle to an axially inwardly inclined surface provided by said transversely extending wall of said rotating portion of said torque transmitting unit at said first location, and each of said passageways terminates at an opening in said inclined surface to provide said intake port.

12. A torque transmitting unit as set forth in claim 1, including a relief flow means in communication with said passageways, said relief flow means being adapted to receive and vent fluid from said passageways away from said disc means, said closing means being arranged to open and to substantially close said relief flow means respectively upon operation of the closing means to increase and decrease the axial proximity of said first and second disc means.

13. A torque transmitting unit as set forth in claim 12, wherein said closing means includes a movable member arranged to move from a non-torque transmitting first position to a torque transmitting second position and to apply a closing pressure to said discs under the control of said closing means, and said relief flow means is arranged to displace said movable member from said torque transmitting position upon interruption of said closing pressure.

14. A torque transmitting unit as set forth in claims 12 or 14, wherein said relief flow means has a cross-sectional area directly proportional to the axial proximity of said first and second disc means.

15. A torque transmitting unit as set forth in claim 12, wherein said relief flow means comprises a plurality of relief flow channels communicating with said second location, said relief flow channels each having a cross-sectional area directly proportional to the axial proximity of said first and second disc means.

16. A torque transmitting unit as set forth in claim 1, wherein said disc means has a contact area over which said fluid film extends, and said passageways are also constructed and arranged to provide a pumping capacity sufficient to dissipate heat energy in an amount ranging from about 0.002 to about 0.009 horsepower per square inch of contact area, for each degree Fahrenheit of temperature differential between the fluid entering said passageways from said reservoir of fluid and the temperature of the heated fluid expelled from between the discs, said energy generated by relative rotation between said first and second disc means when said second disc means is locked against rotation.

17. A torque transmitting unit as set forth in claim 1, wherein said disc means has a contact area over which said fluid film extends, and said passageways are also constructed and arranged to provide a pumping capacity sufficient to dissipate heat energy in an amount of about 0.009 horsepower per square inch of contact area, for each degree Fahrenheit of temperature differential between the fluid entering said passageways from said reservoir of fluid and the temperature of the heated fluid expelled from between the discs, said energy generated by relative rotation between said first and second disc means when said second disc means is locked against rotation.

18. A torque transmitting unit as set forth in claims 1, 4, 16, or 17, wherein said passageways comprise the sole pump member for delivery of fluid under pressure from said first location to said disc means.

19. A method of converting a disc clutch to an oil shear or a hydroviscous torque transmitting unit of the disc type wherein films of fluid are maintained between adjacent discs for purposes of torque transmission comprising providing a clutch of the disc type having first disc means adapted to be operatively connected to a shaft and second disc means adapted to be operatively connected to an element, a central shaft bore or a central body portion adapted to have a shaft bore formed therein, a rotating portion having an axis of rotation about which said disc means are adapted to rotate, and closing means for controlling the relative axial proximity of said first and second disc means to thereby control the thickness of fluid films between adjacent disc means and the transmission of torque, comprising enclosing said rotating portion within a housing for confining a reservoir of fluid, said rotating portion being arranged to extend into said reservoir of fluid, providing fluid supply means for delivery of fluid from said reservoir of fluid to the innermost extent of said disc means, forming a plurality of passageways in said rotating portion of said clutch, said passageways being adapted to supply fluid under pressure to said disc means, each of said passageways extending from a first location adjacent said shaft bore for intake of fluid to a radially outward second location for delivery of fluid to said disc means, forming in each of said passageways an inclined portion extending from an intake port adjacent said first location to said second location, said inclined portion comprising the major extent of said passageways sloping said inclined portion of said passageway at a sufficient inclined angle with respect to the shaft bore to draw fluid into said passageway directly from said reservoir fluid at said first location due to the centrifugal pumping action developed upon rotation of said rotating portion of the clutch, minimizing internal fluid friction and cavitation within said fluid supply means by maintaining the inclined angle of said inclined portion at a substantially constant slope, extending said inclined portion in a substantially uniform direction free of abrupt changes in direction, and locating said intake port in a transversely extending wall of the rotating portion immediately adjacent said axis of rotation to thereby cause said passageways to centrifugally pump fluid to said disc means at a flow sufficient to maintain oil shear or hydroviscous operation.

20. A method as set forth in claim 19, including the step of forming relief flow channels communicating with said passageways adjacent said second location.

21. A method as set forth in claim 19, including the step of forming said shaft bore to minimize the shaft bore diameter in accordance with the reduced torque loadings of hydroviscous operation and thereby maximize the radial extent and pumping capability of said rotating portion.

22. A method as set forth in claim 19, including the step of providing an axially inwardly inclined surface in said transversely extending wall of said rotating portion of said clutch at said first location, forming said intake ports in said inclined surface, and disposing each of said passageways at a right angle to said inclined surface.

23. A torque transmitting unit of the disc type wherein films of fluid are maintained between adjacent disc means for purposes of torque transmission, comprising first disc means adapted to be operatively connected to an input shaft received within a central shaft bore and second disc means adapted to be operatively connected to an output element, closing means for controlling the relative axial proximity of said first and second disc means to thereby control the thickness of fluid films between adjacent disc means and the transmission of torque, and fluid supply means adapted to continuously deliver fluid from a reservoir of fluid to said disc means, said fluid supply means comprising a plurality of passageways in a rotating portion of said torque transmitting unit, each of said passageways extending from a first location adjacent said shaft bore for intake of fluid to a radially outward second location for delivery of fluid to said disc means, said passageways being constructed and arranged to draw fluid directly from said reservoir of fluid and to deliver a flow of fluid to said disc means sufficient to sustain oil shear or hydroviscous operation, a fluid reservoir coupling mounted about said input shaft and adapted to receive fluid from a source of fluid under pressure and to deliver the fluid to said reservoir of fluid at substantially atmospheric pressure.

24. A torque transmitting unit as set forth in claim 23, wherein said fluid reservoir coupling includes pressure relief means.

25. A torque transmitting unit as set forth in claim 23, wherein said fluid reservoir coupling comprises an annular seal member cooperating with said torque transmitting unit to encircle said first location, a stationary member adapted to be mounted on said input shaft and to be connected to said source of fluid, said stationary member sealingly engaging said annular seal member to provide said reservoir of fluid at said first location and including pressure relief means to maintain fluid within said reservoir at atmospheric pressure.

26. A torque transmitting unit as set forth in claim 25, wherein said pressure relief means comprises an open vent in a rotationally stationary portion of said fluid reservoir coupling.

* * * * *